Feb. 11, 1936.　　　A. E. AVELS　　　2,030,677
DOORLOCK
Filed Feb. 21, 1934
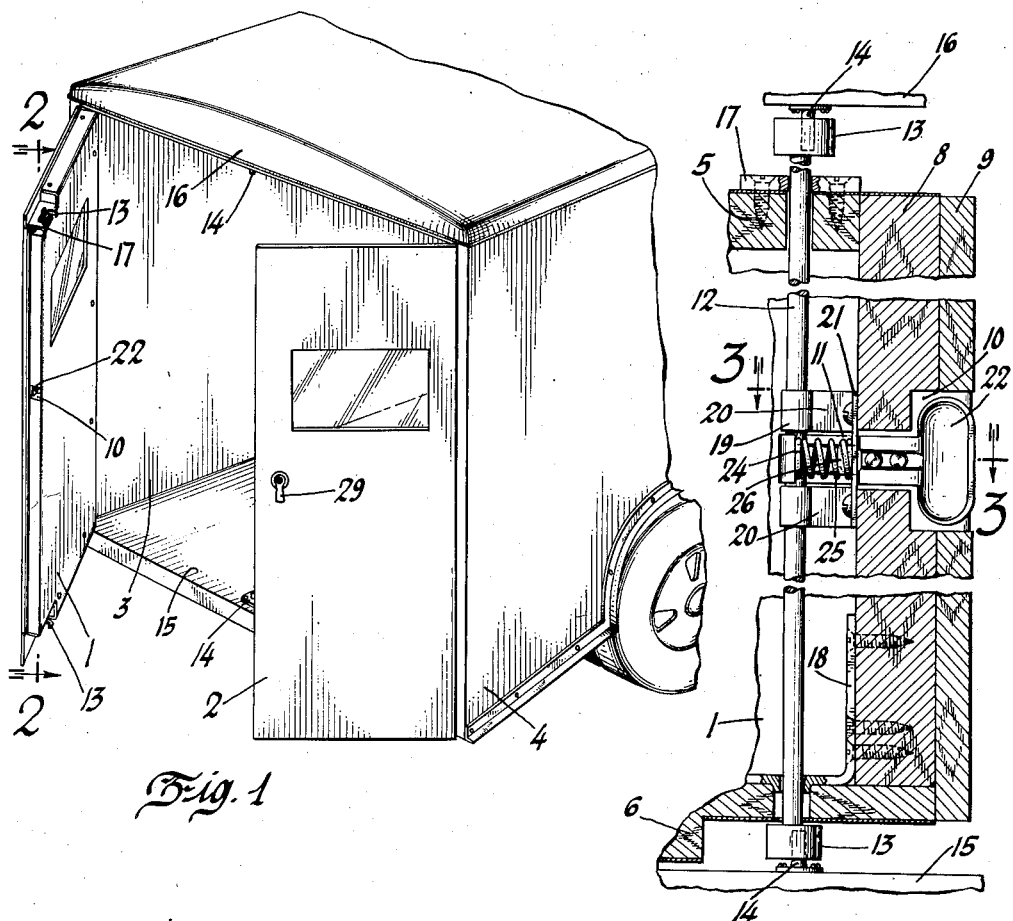
Fig. 1
Fig. 2
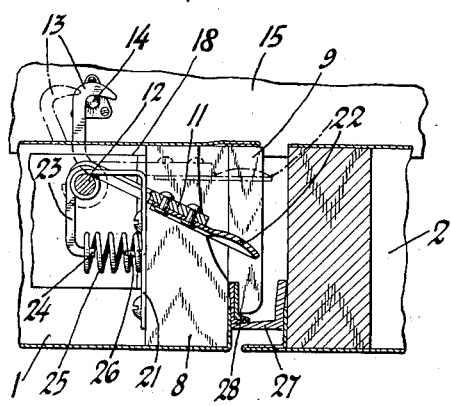
Fig. 3
Fig. 4
Inventor
Albert E. Avels
By Blackmore, Spencer & Flick
Attorneys Patented Feb. 11, 1936

2,030,677

UNITED STATES PATENT OFFICE 2,030,677

DOORLOCK

Albert E. Avels, Indianapolis, Ind., assignor to General Motors Corporation, Detroit, Mich., a corporation of Delaware Application February 21, 1934, Serial No. 712,286

3 Claims. (Cl. 292—120)

This invention relates to motor vehicles and more particularly to an improved latching mechanism adapted especially for use with double doors for the loading opening at the rear of truck bodies of the small delivery type.

As ordinarily constructed the opening at the rear of the so-called panel bodies is closed by two doors, arranged end to end and hinged at ends removed from each other to swing outwardly from the center. Both doors carry latch mechanisms at their swinging ends and are closed and latched in succession. The first door to be closed is provided usually with catches at the top and bottom to engage abutments on the floor and roof of the body, whereby a secure attachment is afforded against racking and twisting strains and the door imparts stiffness and reinforcement to the body proper.

For operating the catches in unison it is the practice to connect them through a vertical latch bar with an inwardly projecting handle mounted at a convenient height on the inner or compartment side of the door so that although the handle is concealed from the outside it can be manipulated easily by merely reaching the hand into the body after the other door is opened. The other door has an outside door handle and is locked either to the first closed door or to the floor and roof of the body as desired. Because the inside door handle projects a considerable distance into the body compartment, interference sometimes occurs between it and the goods or merchandise being carried, and damage is done to fragile loads, particularly if the load shifts or bounces during transit or if the door is carelessely slammed shut.

To eliminate this cause of damage and provide a smooth wall surface on the interior of the body it is proposed to avoid projecting parts and locate the latch operating handle wholly within the confines of the door where it will be out of the way and yet easily accessible when the door is to be opened.

In addition, the invention contemplates a simple and inexpensive operating mechanism which in a specific embodiment involves an angular handle secured on a door enclosed rockshaft with one leg positioned within a recess in the door post and the other leg providing a seat for a return spring carried by an attachment bracket for the rockshaft.

A preferred embodiment of the invention is illustrated in the accompanying drawing, wherein Figure 1 is a perspective view of the rear end of a truck body, with the doors partly opened; Figure 2 is an enlarged sectional view taken on line 2—2 of Figure 1, at the free or swinging edge of one of the doors; Figure 3 is a transverse section taken as on line 3—3 of Figure 2, showing the swinging edges of the two doors in closed position; Figure 4 is a detail perspective view of the assembly of operating handle and mounting bracket for the rockshaft.

Referring to the drawing, the numeral 1 indicates the left-hand door and the numeral 2 the right-hand door, hingedly hung at their remote edges to the vehicle body sides 3 and 4, respectively. Both doors are preferably interiorly hollow and comprise front and rear panels of sheet metal secured over a suitable framework.

In the case of the left-hand door 1 the framework may include, as shown in Figure 2, a top cross member 5 and a bottom member 6 connected at the swinging edge of the door by a vertical post 8 having a finishing strip 9 on its outer face. At an intermediate point the door post 8 and trim strip 9 are provided with a shouldered opening 10 extending radially therethrough to the interior of the door from the face of the trim strip. Located within this opening or recess 10 is one leg 11 of an L-shaped member secured at the angle therein by welding or the like, to a vertically extending rockshaft 12, which projects at opposite ends through the top and bottom frame members 5 and 6 and carries latch members or hooks 13. Suitable pins or abutments 14 are provided in the floor 15 and the roof 16 of the body for locking engagement with the hooks 13. A bearing plate 17 for the rockshaft 12 may be screwed or otherwise fastened to the top frame member 5 and the lower end of the rockshaft may have a similar bearing in an angle plate 18 or the like, fastened to the frame members.

An intermediate bearing for the rockshaft is provided by a pair of spaced eyes 19 on bifurcated legs 20 of an angle bracket, whose base 21 is secured, as by screws, on the inside of the door post 8 in bridging relation to the opening 10. The space between the legs 20 extends partly into the plate 21 and receives the leg 11 of the operating handle, the end of the slot providing a seat or stop for the operating arm at one limit of its swinging movement. Beyond the plate 21 the arm 11 carries through rivets, an extension of a dished hand piece 22. The other leg 23 of the L-shaped actuating member extends laterally from the rod 12 and terminates in an angularly disposed shouldered tongue 24, which provides a locating seat for the endmost coils of a return spring 25 seated at its opposite end against the plate and retained thereon by an angular tab 26 struck out from the plate 21 for projection into the interior of the coil spring.

In the closed position of the parts, as illustrated in Figure 3, the side posts at the swinging edges of the two doors extend side by side and the door 2 may be provided with an angle strap 27 to overlap the finishing strip 9 and engage with the flexible closure seal 28 held between the strip 9 and the post 8. Because of this overlapping arrangement, it will be apparent that the left-hand door can be opened only after the right-hand door has been swung out and that in the closed position the recess 10 is closed and the operating handle inaccessible for manipulation and located wholly within the overall dimensions of the door.

For actuating the latching mechanism for the right-hand door, an outside door handle 29 is provided. When the door 2 is opened through the agency of the handle 29, access may then be had to the finger piece 22 of the latching mechanism within the recess to swing the rockshaft against the resistance of the spring 25 and move the hooks 13 out of engagement with their cooperating locking members 14, as is illustrated by the broken line position of the parts in Figure 3. When the door 1 is again swung to closed position the hook 13 being provided with a camming surface will ride on the pin 14, swinging the rockshaft until it passes the pin when the spring snaps it into latched position.

From the above description it will be apparent that there is provided a construction which is both simple in design and economical to manufacture, and which in use is easy to operate and is unlikely to get out of order since it is enclosed within the door and protected against damaging blows, and because of its location wholly within the margins of the door, cannot injure merchandise contained within the body space.

I claim:

1. Concealed latching mechanism for one of a pair of cooperating swinging doors which are closed and latched in succession with their swinging edges in end to end relation, said mechanism including an oscillatory operating handle located within a radial recess in the swinging edge of the door and ended within said edge, a plate over the inner end of the recess having a bifurcated end, a part of which lies in the plane of the plate to receive the handle with the remainder thereof extending angularly from the plate and terminating in curled eyes, and a rockshaft projecting vertically through said eyes interiorly of the door structure for actuation by said oscillatory handle.

2. Concealed latching mechanism for one of a pair of cooperating swinging doors which are closed and latched in succession with their swinging edges in end to end relation, said mechanism including an angle bracket having a base portion adapted for mounting within the door structure and a leg portion terminating in a curled eye, an L-shaped lever having one leg extending through said base portion to terminate within an opening in the edge of the door and the other leg extending in spaced substantially parallel relation to said base, a coiled compression spring seating on and tending to spread apart the last mentioned leg and the base, locating projections on said leg and base extending into the endmost coils of the spring, and a rockshaft secured at the apex of the legs of said lever and oscillatably supported within the curled eye of the bracket.

3. In a swinging door having a rock shaft extending interiorly of the door on an axis in spaced parallel relation to the axis of swinging movement of the door and being operatively connected with a door latching member, a post in the swinging edge of the door, having intermediate its ends a T-shaped recess extending therethrough radially of the door axis, a shaft mounting plate secured to said post over the inner end of said recess and provided with a pair of spaced lateral fingers terminating in curled eyes to receive said rock shaft, an L-shaped strap secured to the rock shaft with one leg projecting between said spaced fingers and into said recess and terminating in a T-shaped head ending wholly within the T-shaped recess in the post and the other leg projecting in substantially spaced parallel relation with said mounting plate, and a compression spring seating at opposite ends on the mounting plate and said last mentioned leg.

ALBERT E. AVELS.